United States Patent [19]

Gross

[11] Patent Number: 5,065,514

[45] Date of Patent: Nov. 19, 1991

[54] ATTACHMENT FOR METAL DEMOLITION SHEARS

[75] Inventor: Sol N. Gross, North Versailles, Pa.

[73] Assignee: Ace Demolition Incorporated, N. Versailles, Pa.

[21] Appl. No.: 587,412

[22] Filed: Sep. 25, 1990

[51] Int. Cl.⁵ .............................................. B26B 1/00
[52] U.S. Cl. .................................... 30/134; 144/34 E
[58] Field of Search ........................ 30/134, 228, 229; 83/608, 609; 144/34 E

[56] References Cited

U.S. PATENT DOCUMENTS 4,543,719 10/1985 Purser ............................... 30/229 X Primary Examiner—Douglas D. Watts
Attorney, Agent, or Firm—Reed Smith Shaw & McClay

[57] ABSTRACT

An attachment means for a heavy duty shear is disclosed. The attachment means permits the shear to be attached to a front end loader, which previously was not possible. Prior to the attachment means of the present invention, such shear could only be attached to the dipper stick of a back hoe.

8 Claims, 3 Drawing Sheets

ATTACHMENT FOR METAL DEMOLITION SHEARS

FIELD OF THE INVENTION

This invention relates to an attachment for a heavy duty shear, especially adapted to be fitted on a rigid boom of a mobile vehicle, such as a shovel front end loader.

BACKGROUND OF THE INVENTION

Heavy duty shears of the type powered by hydraulic cylinders have proven extremely useful in handling metal scrap of various sorts. Such scrap may be in the form of pipe made of steel, soft iron or cast iron; structural beams such I-beams, channels and fabricated reinforced concrete girder beams, rods and heavy cables having diameters up to three inches; and larger metal sheets and plates and pieces that are cast, roll-stamped or otherwise formed. Typically, heavy duty shears such as those illustrated in U.S. Pat. Nos. 4,519,135; 4,616,417; and 4,776,093 can be fitted on the dipper stick of a back hoe so that they may be controlled fairly well in handling the above-mentioned types of scrap. However, such shears generally cannot also be fitted to the boom of a front end loader, which would be especially useful in the context of demolition of railroad cars. Such shears typically are attached to the boom of a back hoe via a series of hydraulic cylinders, one of which is attached to the distal end of the shear. However, such attachment is not possible in the context of the boom of a front end loader, where the hydraulic cylinders are positioned beneath the boom.

SUMMARY OF THE INVENTION

The present invention solves these problems by providing an attachment device which permits the heavy duty shears described above to be attached to the boom of a shovel front end loader with minimal modification to the shear. Thus, the same heavy duty shear may be used either with a front end loader or a backhoe, which was not previously possible. A preferred embodiment of the invention comprises a plurality of securing flanges connected to a pair of side brackets. The side brackets in turn have a hydraulic pin attachment running therethrough. The securing flanges and side brackets are welded to the heavy duty shear or may be integrally fabricated thereto, thereby creating a point on the shear to which the hydraulic cylinder of the front end loader may be attached.

Other details, objects and advantages of the invention will become apparent as the following description of the presently preferred embodiments and presently preferred methods of practicing the invention proceeds.

BRIEF DESCRIPTION OF THE DRAWINGS

In the accompanying drawings, the preferred embodiments of the invention and preferred methods of practicing the invention are illustrated in which.

DESCRIPTION OF PRESENTLY PREFERRED EMBODIMENTS

Figure 1:
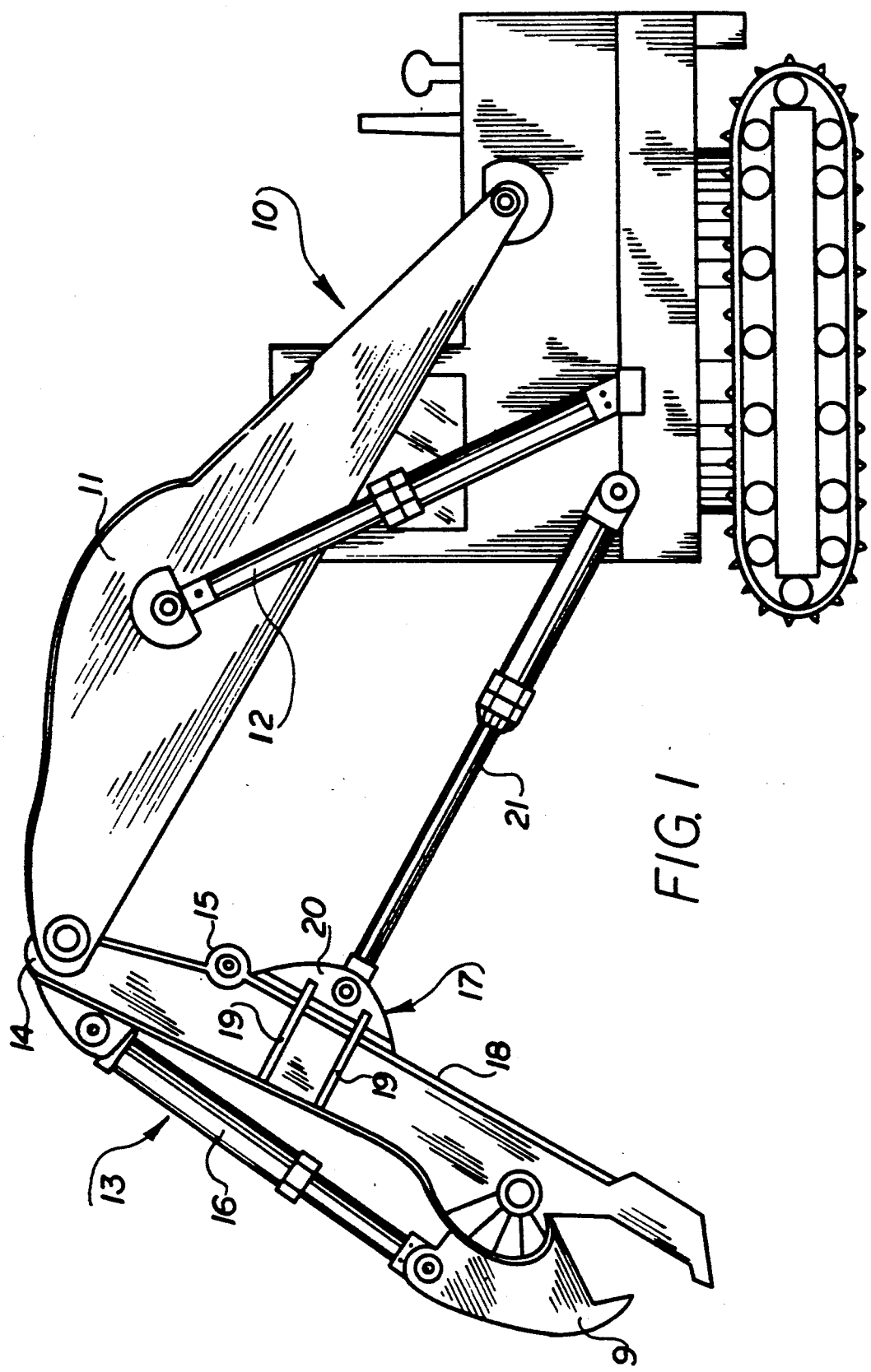
FIG. 1 illustrates a schematic elevation view of a shovel front end loader utilizing the attachment of the present invention in connection with a heavy duty shear.

FIG. 1 illustrates a shovel front end loader generally 10 having a boom 11 which is supported and moveable by cylinder 12. A heavy duty shear such as that disclosed in my U.S. Pat. No. 4,776,093, which patent and its teachings are incorporated in their entirety by reference herein, is attached to the distal end of the boom 11 as shown. The shear, generally 13, includes a rear attachment flange 14 which permits the shear 13 to be pivotally attached to the boom 11. The flange 14 of the shear 13 disclosed in U.S. Pat. No. 4,776,093 is used as a point of attachment for a top cylinder on a dipper stick of a back hoe. However, in the present context this flange is used as a pivotal attachment point to the boom 11 as illustrated. A lower attachment flange 15 is used for attaching the shear 13 to the dipper stick of a front end loader as disclosed in U.S. Pat. No. 4,776,093, however this flange is preferably not used when the shear is attached to a front end loader as illustrated in FIG. 1.

The heavy duty shear 13 also includes a top cylinder 16 which actuates a moveable jaw means 9 when operating the shear.

In a preferred embodiment of the present invention an attachment means, generally 17, is provided to the undersurface 18 of the shear 13 as illustrated, between the forward end and rearward end of the shear 13. This attachment means 17 includes a plurality of securing flanges 19 and a cylinder attachment flange, or side bracket 20. The lower cylinder 21 of the front end loader 10 attaches to the attachment flange 20 as illustrated. In this manner the shear 13 can be made to raise or lower using the boom 11 actuated by the cylinder 12 and the cylinder 21 attached to the attachment means 17 of the shear 13.

Figure 2:
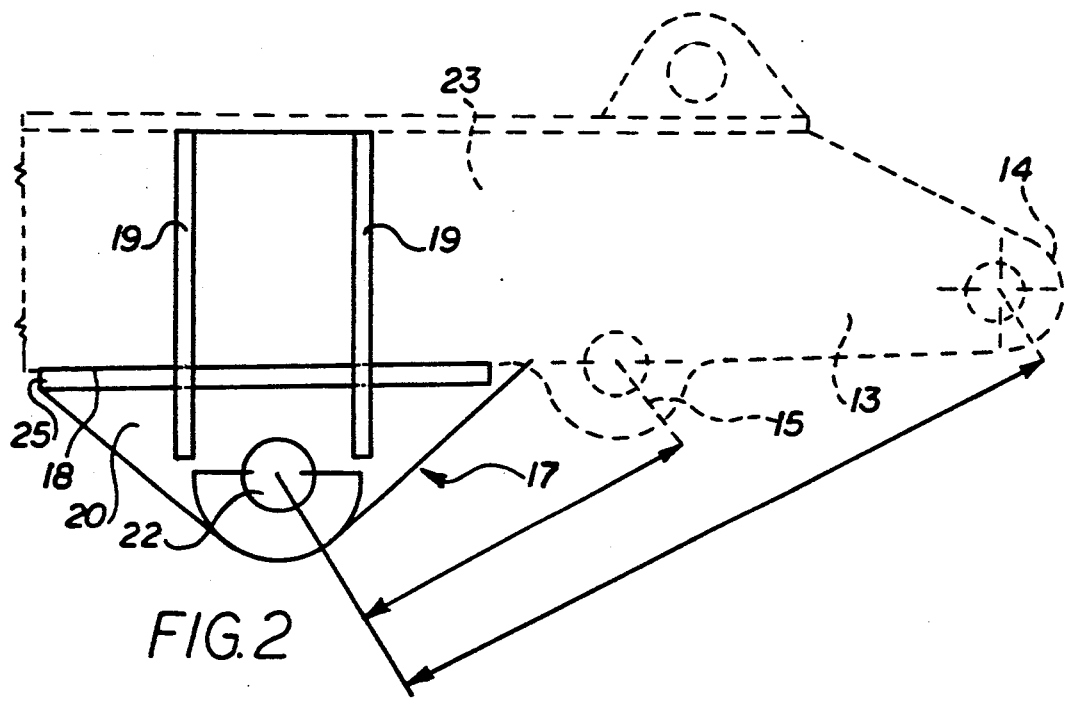
FIG. 2 illustrates a side view of the attachment means of the present invention attached to a portion of a heavy duty shear.

FIG. 2 shows the attachment means 17 of a preferred embodiment of the present invention in greater detail. As illustrated, the attachment means 17 includes a side bracket 20 having a hole 22 bored therethrough for receiving a cylinder pin (not shown). The cylinder pin slides into the hole 22 and through a hole in the end of the cylinder 21, thereby permitting the attachment means 17 to be pivotally connected to the cylinder 21. The attachment means 17 is securely fastened to the underside 18 of the shear 13 as illustrated. For modifications to existing shears, this may be done, for example, by welding the attachment means 17 to the shear 13. Alternatively, the attachment means may be bolted to, or integrally formed with, the shear 13.

Preferably, the attachment means 17 further includes a plurality of securing flanges 19 as illustrated. These support flanges 19 are attached to the outer side of the attachment means side bracket 20 and extend along and are attached to the side 23 of the shear 13, preferably by welding the securing flanges 19 to the sides 23 of the shear 13. As illustrated, the securing flanges 19 preferably extend from a convenient point of attachment on the side bracket along the full width of the side 23 of the shear 13.

Figure 3:
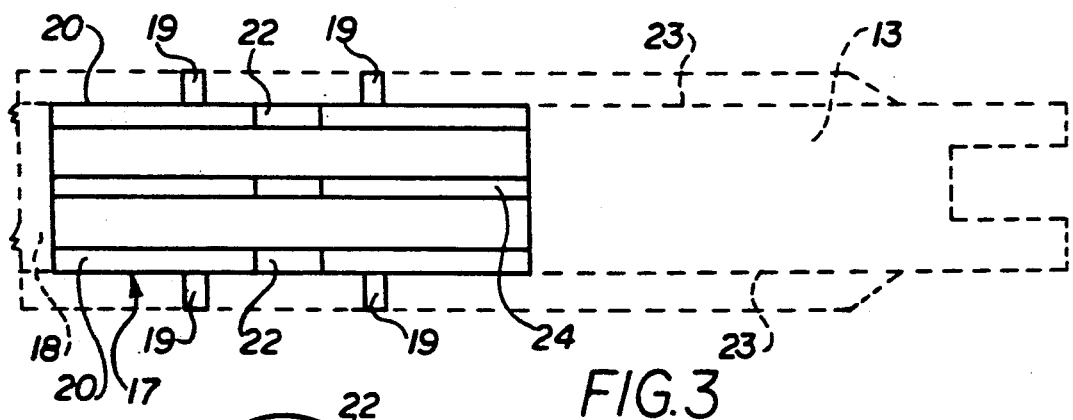
FIG. 3 illustrates a bottom view of the attachment means illustrated in FIG. 2.

FIG. 3 illustrates a bottom view of a preferred embodiment of the attachment means 17. As illustrated, the attachment means 17 includes two substantially parallel side brackets 20 which are preferably flush with the opposing substantially parallel sides 23 of the shear 13. In addition, the attachment means 17 may further include a central bracket 24 which is positioned substantially on the center line of the attachment means 17 and between and substantially parallel to the side brackets 20. This central bracket 24 is preferably substantially the same size as the side brackets 20 and preferably has a hole 22 therethrough, which hole 22 lines up with the holes 22 in the side brackets 20 as illustrated. The holes 22 in the side brackets 20 and central bracket 24 are preferably line bored and of substantially the same size to permit the insertion of a cylinder pin therethrough. In addition to providing additional support to the attachment means 17, the central bracket 24 permits the cylinder 21 to be mounted on either side of the central bracket 24 or permits the mounting of dual cylinders on both sides of the central bracket 24.

Referring again to FIG. 2, the attachment means 17 may further include a top plate 25 positioned between the side brackets 20 and the bottom 18 of the shear 13. This top plate 25 is preferably welded to the side brackets 20 and the central bracket 24 (if the central bracket is used), and the top surface of the plate 25 is attached, for example by welding or bolting, to the bottom surface 18 of the shear 13. As illustrated, the top plate 25 is preferably shaped to substantially conform to the shape of the lower surface 18 of the shear 13. The top plate 25 provides further rigidity and support to the attachment 17.

Returning again to FIG. 3, the attachment means 17 is preferably centered on the center line of the shear 13 as illustrated such that the securing flanges 19 saddle the sides 23 of the shear 13.

Figure 4:
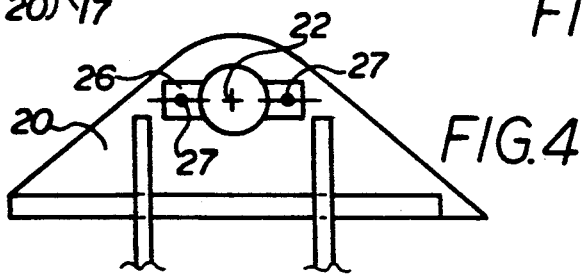
FIG. 4 illustrates a side view of the bracket of the attachment means opposite that illustrated in FIG. 2.

Referring now to FIG. 4, the other side of the attachment means 17 illustrated in FIG. 2 is illustrated. This view illustrates a recessed portion 26 which is used to retain a keeper bar (not shown) attached to the cylinder pin (also not shown) used for attaching the cylinder 21 to the attachment means 17. This recessed portion 26 preferably has tapped holes 27 therein for receiving attachment bolts.

Figure 5:
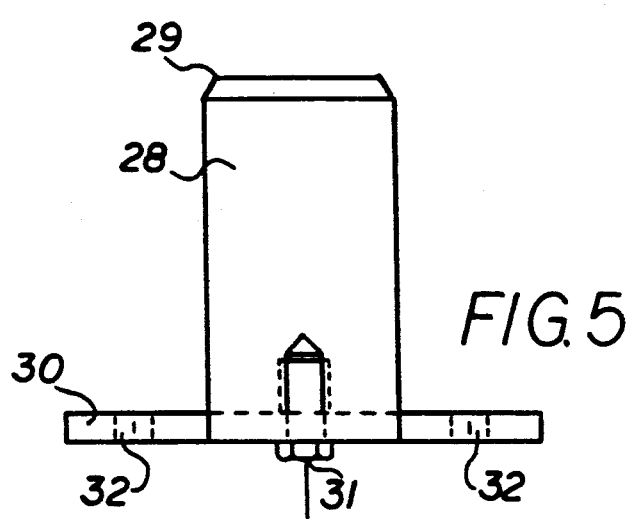
FIG. 5 illustrates a cylinder pin used in connection with the attachment means of the present invention.
Figure 6:
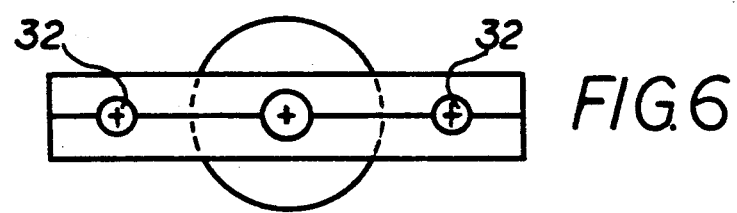
FIG. 6 illustrates another view of a cylinder pin used in connection with the attachment means of the present invention.

FIG. 5 illustrates a cylinder pin 28 which may be used to attach the cylinder 21 to the attachment means 17. The cylinder pin 28 preferably includes a 45 degree chamfered portion 29 to assist in inserting the pin 28 into the holes 22 of the attachment means 17. The cylinder pin 28 further preferably includes a keeper bar 30 attached to the cylinder pin 28, for example with a bolt 31 as illustrated. The keeper bar 30 preferably has holes 32 tapped therein which correspond to the holes 27 in the side flange 20. The keeper bar 30 is sized and shaped to be recessed within the recessed portion 26 when the cylinder pin is inserted into the hole 22 illustrated in FIG. 4.

The attachment means 17 of the present invention permits heavy duty shears such as those disclosed in U.S. Pat. No. 4,776,093 to be attached both to the dipper stick of a backhoe and to the boom 11 and the lower cylinder 21 of a front end loader 10 as illustrated in FIG. 1. This was not possible prior to the present invention. The attachment means 17 may be shifted forwardly or rearwardly relative to the shear 13. However, it has been found that a distance of about six feet from the center of the hole 22 to the center of the hole in the flange 14 illustrated in FIG. 2 is acceptable. Also, a distance of 24 inches from the center of the hole 22 to the center of the hole in the flange 15 illustrated in FIG. 2 has proven acceptable. These distances, of course, will vary depending on the type of boom and cylinder used with the front end loader, the weight and length of the shear 13, the materials of construction of the shear and other factors which are readily ascertainable by those skilled in the art. The placement of the attachment means 17 should not be so close to the front end of the shear as to require an extraordinarily long cylinder 21, but likewise should not be placed too far towards the rear, or flange 14, of the shear so as to require an exceedingly large cylinder force. A preferred embodiment of the present invention has utilized an 8⅝ inch diameter cylinder 21 having a hydraulic force of 5,000 pounds per square inch or a total of 283,725 pounds of force with success.

The attachment means 17 may be fabricated of any durable material, although T-1 steel has proven useful and is used in all parts of a preferred embodiment of the attachment means 17, except for the securing flanges 19 which are fabricated of 1¼"—T-1 steel plate and the cylinder pin 28 which is fabricated of 5" dia. 4140 cold rolled steel. If the attachment means 17 is to be welded to the shear 13 it is important that all welds be strong enough to support the attachment of the attachment means to the shear 13 and to the cylinder 21. All gussets and stiffeners are fabricated of 1¼" thick 1020 steel rate and ¾"×2½" 1020 steel bar stock.

What is claimed is:

1. An attachment means for attaching a heavy duty shear to a shovel front end loader, said shear having a lower surface and two substantially parallel sides, said shear further having a forward end and a rearward end, said attachment means having means for securely fastening said attachment means to the lower surface of said heavy duty shear, said attachment means including two substantially parallel side brackets having substantially similarly sized holes line bored therethrough for receiving a cylinder pin for providing pivotal attachment of said attachment means to a lower hydraulic cylinder from said front end loader, such that said lower cylinder can raise and lower said shear, said attachment means adapted to be positioned between said rearward end and said forward end of said heavy duty shear on the lower surface of said heavy duty shear.

2. The attachment means of claim 1 wherein said side brackets are fastened to said sides of said shear by a plurality of securing flanges extending from said side brackets along both sides of said shear.

3. The attachment means of claim 1 further including a central flange centrally disposed along said attachment means between and substantially parallel to said side brackets and having a hole bored therethrough in line with and substantially similarly sized relative to said line bored holes in said side brackets.

4. The attachment means of claim 1 further including a top plate spanning said side brackets and attached thereto, said top plate adapted to secure said attachment means to said lower surface of said shear.

5. A heavy duty shear including an attachment means according to claim 1.

6. A heavy duty shear including an attachment means according to claim 2.

7. A heavy duty shear including an attachment means according to claim 3.

8. A heavy duty shear including an attachment means according to claim 4.

* * * * *